(12) United States Patent
Viel

(10) Patent No.: US 10,126,187 B2
(45) Date of Patent: Nov. 13, 2018

(54) DEVICE FOR MONITORING WEAR ON OVERHEAD LINES

(71) Applicant: HOTTINGER BALDWIN MESSTECHNIK GMBH, Darmstadt (DE)

(72) Inventor: Wolfgang Viel, Darmstadt (DE)

(73) Assignee: Hottinger Baldwin Messtechnik GmbH, Darmstadt (DE)

( * ) Notice: Subject to any disclaimer, the term of this patent is extended or adjusted under 35 U.S.C. 154(b) by 0 days.

(21) Appl. No.: 15/034,993

(22) PCT Filed: Nov. 7, 2014

(86) PCT No.: PCT/DE2014/000571
§ 371 (c)(1),
(2) Date: Aug. 16, 2016

(87) PCT Pub. No.: WO2015/067235
PCT Pub. Date: May 14, 2015

(65) Prior Publication Data
US 2016/0349126 A1    Dec. 1, 2016

(30) Foreign Application Priority Data
Nov. 7, 2013   (DE) .......................... 10 2013 018 819

(51) Int. Cl.
*G01L 1/24*   (2006.01)
*B60L 5/20*   (2006.01)
(Continued)

(52) U.S. Cl.
CPC ................ *G01L 1/246* (2013.01); *B60L 5/20* (2013.01); *B60L 5/22* (2013.01); *G01D 5/3537* (2013.01); *G01L 5/107* (2013.01)

(58) Field of Classification Search
CPC ... G01L 1/246; G01L 1/24; G01L 1/04; G01L 5/107; B60L 5/20; B60L 5/22; B60R 2021/01516
(Continued)

(56) References Cited

U.S. PATENT DOCUMENTS 6,018,160 A * 1/2000 Bennion ................ G01B 11/16
250/227.14

FOREIGN PATENT DOCUMENTS

DE    10249896 B4    6/2007
EP    0356834 A2    3/1990
(Continued)

OTHER PUBLICATIONS

International Search Report issued by the European Patent Office in International Application PCT/DE2014/000571.

*Primary Examiner* — Harshad R Patel
*Assistant Examiner* — Nigel Plumb
(74) *Attorney, Agent, or Firm* — Henry M. Feiereisen LLC

(57) ABSTRACT

A device for measuring force and for monitoring wear on overhead lines includes a force-measuring system which includes two contact bars which, in an operating state, are oriented at a right angle to an overhead line to be monitored, and two connection bars, which, in the operating state, are oriented parallel to the overhead line. A bar-shaped force transducer is fastened to each end portion of the two connection bars and each of the bar-shaped force transducers extends in an axial direction of the respective connection bar.

7 Claims, 5 Drawing Sheets

(51) Int. Cl.
*B60L 5/22* (2006.01)
*G01L 5/10* (2006.01)
*G01D 5/353* (2006.01)

(58) Field of Classification Search
USPC .............. 73/862.624, 862.621, 862.381, 862
See application file for complete search history.

(56) References Cited

FOREIGN PATENT DOCUMENTS

| | | | | |
|---|---|---|---|---|
| EP | 1707427 | A1 | 4/2006 | |
| EP | 1707427 | * | 10/2006 | ................ B60L 5/20 |
| FR | 2962217 | A1 | 1/2012 | |

* cited by examiner

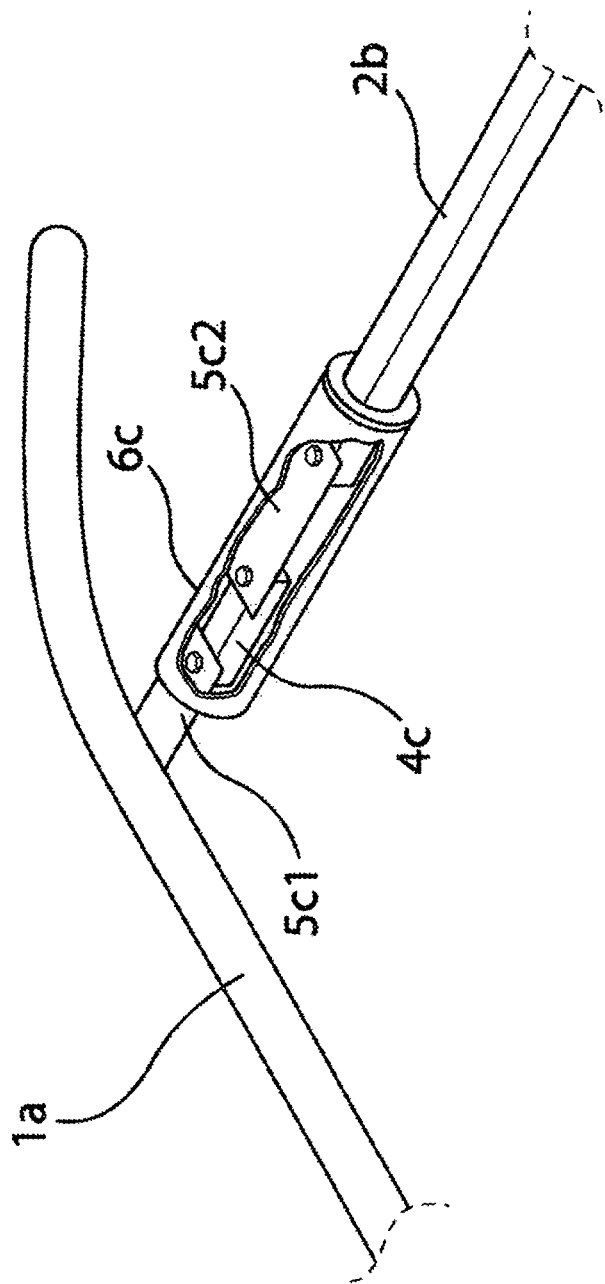

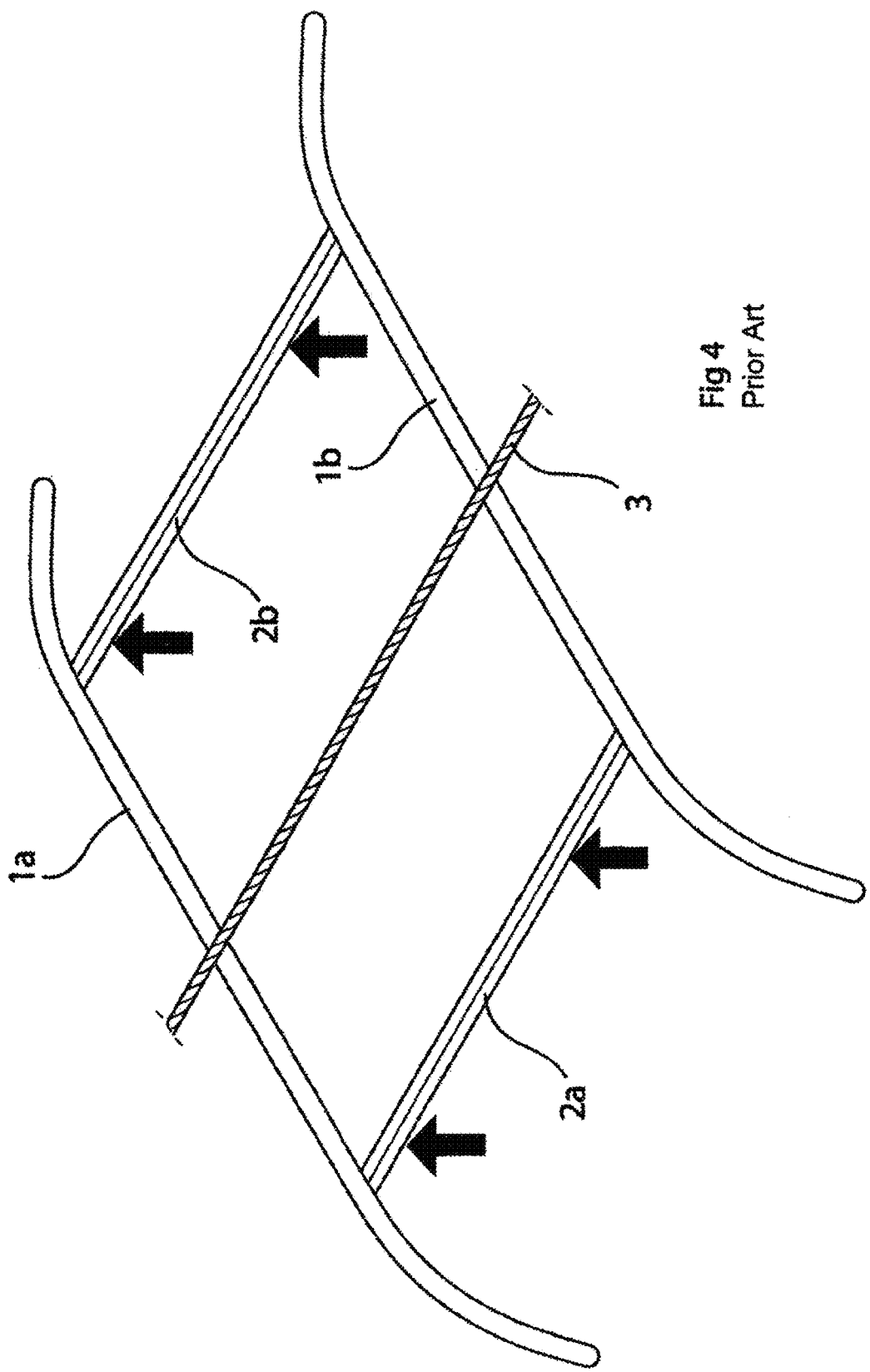

DEVICE FOR MONITORING WEAR ON OVERHEAD LINES

CROSS-REFERENCES TO RELATED APPLICATIONS

This application is the U.S. National Stage of International Application No. PCT/DE2014/000571, filed Nov. 7, 2014, which designated the United States and has been published as International Publication No. WO 2015/067235 and which claims the priority of German Patent Application, Serial No. 10 2013 018 819.9, filed Nov. 7, 2013, pursuant to 35 U.S.C. 119(a)-(d).

BACKGROUND OF THE INVENTION

The invention relates to a device for monitoring wear on overhead lines for electrically-operated rail vehicles which include a current collector with a pair of contact bars.

The force with which a pair of contact bars of a current collector is pressed against the overhead line has an impact on both wear of the overhead line and wear of the contact bars. Measuring the contact force, and in particular measuring momentary changes in the contact force enables inference about damage to the overhead line or to the contact bars.

Various devices for measuring the contact force and for monitoring wear are known in the art. Document DE 102 49 896 B4 describes these correlations. Reference is made here to problems that may be caused when using force sensors with electrical strain gauges (SG), since the sensor system is subjected to a high voltage potential between 1.5 kV and 25 kV and is supplied via a battery for example. When using two motorcycle batteries, an operating time of about 24 hours can be realized. Power generation from the overhead line for this electrical force measurement technique is very complex and prone to fail. For that reason, document DE 102 49 896 B4 proposes to use sensors of the fiber Bragg grating type, designated FBG-sensors hereinafter, because they are not affected by the electrical high-voltage fields. However, manufacture of FBG-sensors with higher precision is difficult. On one hand, the thin optical fibers with the FBG-sensors can easily be attached to structural components which are at least partially subjected to the forces to be measured. However, this procedure leads to a poor measuring accuracy. Deformation bodies, used especially for conventional SG made of metal foil, can be equipped with FBG-sensors only to a limited extent, since the application of FBG-sensors requires significantly more space because of the high elasticity and the great bending radii of the optical fibers to be maintained during attachment. In other words, the attachment points on the deformation bodies for FBG-sensors have to be configured much larger, when compared to deformation bodies for electrical, i.e., metallic SG, so that the volume of the deformation body is increased overall.

In the intended field of application, there is the requirement that the used sensor system should not increase the air resistance at the current collector to more than 5%. The measurement systems known in the art are either relatively inaccurate or too bulky, i.e., the air resistance in travel direction is too high. The demand for a smallest possible air resistance in travel direction is not related to energy savings. The current collectors are constructed and calibrated such that even at high driving speeds they do not tend to vibrate. Mechanical vibrations can cause escalation of uncontrollable resonance effects and damage to the current collector or even to the overhead line. Since retrofitting of the sensor system also causes changes in the flow characteristic, i.e. the air resistance of the current collector, this limit value of maximal 5% is imposed.

A further, basic requirement for these force measurement systems involves lowest possible manufacturing costs and high mechanical sturdiness. When, for example, the overhead lines become iced, the deformation bodies or the sensors attached thereto should not be damaged. In order to meet this requirement, it is known in the art of force measurement and weighing technology to provide overload safeguards in the form of mechanical stops. Such overload safeguards, however, are bulky and thus additionally increase air resistance, if not aerodynamically integrated into existing construction elements of the current collector. Such an aerodynamic integration, however, always requires a special construction and therefore is expensive.

Consequently, the demands for high measurement accuracy, low manufacturing costs, and at the same time high mechanical sturdiness and slight air resistance are difficult to satisfy.

SUMMARY OF THE INVENTION

It is, therefore, the object of the invention to provide a force measurement system for determining the contact force between current collector and overhead line during travel, in order to thus ascertain wear of or damages to the overhead line. The force measurement system should have high mechanical sturdiness with respect to overload, as encountered when the overhead line freezes. Structural size and in particular air resistance in travel direction should be minimal.

This object is attained by a device for monitoring wear on overhead lines via use of a force measurement system including the following features:
   two contact bars which are oriented in the operating mode at a right angle to the overhead line to be monitored,
   two connection bars having first and second end portions which are oriented in the operating mode in parallel relation to the overhead line and pushed upwards, so that the two contact bars are pressed against the overhead line at a predefined force, wherein
   a bar-shaped force transducer having first and second end portions is arranged at each end portion of the two connection bars for arrangement of strain sensors, and
   the first end portions of the force transducers are connected to the contact bar,
   the first end portions of the force transducers are connected to the contact bar, and
   the second end portion of the force transducer is connected to the first end portion of the connection bar,
   the second end portion of the force transducer is connected to the first end portion of the connection bar,
   the second end portion of the force transducer is connected to the second end portion of the connection bar, and
   the second end portion of the force transducer is connected with the second end portion of the connection bar, wherein
   the longitudinal axis of the force transducers extends in direction of the longitudinal axis of the connection bar (2a) and the longitudinal axis of the force transducers extends in direction of the longitudinal axis of the connection bar.

This device has the advantage that it exhibits a particularly slight air resistance in travel direction of the rail vehicle and is relatively resistant to impact-like overloads. In particular, when the overhead line freezes, the used deformation body has shown to be very sturdy. The realized measuring accuracy is significantly higher than in constructions in which strain sensors are merely attached to already existing structural parts, in which case the actually applied forces can be measured only relatively inaccurately.

According to another feature of the invention, a plate-shaped spring element is arranged between each of the contact bars and the bar-shaped force transducers. This refinement of the device has the advantage that it can absorb relatively great impact-like loads without damaging the current collector through overload.

According to another feature of the invention, a plate-shaped spring element is arranged between each of the connection bars and the bar-shaped force transducers. This represents an alternative to the device as described above.

According to another feature of the invention, plate-shaped spring elements are respectively arranged between the contact bars and the bar-shaped force transducers as well as between the connection bars and the bar-shaped force transducers. This refinement of the device has the advantage that it is even more resistant even against relatively great impact-like loads. This embodiment can be considered as the best embodiment.

According to another feature of the invention, the force transducers include fiber Bragg grating sensors (FBG sensors) which are insensitive to electromagnetic fields. Since moving electromagnetic fields can induce voltages in the measurement electronics, the accuracy of the measurements would be interfered with. This is avoided by using FBG sensors, because optical signals are not influenced by electromagnetic fields. Even though this deformation body is slightly bulkier than a deformation body with metal foils SG, due to the previously described correlations, the bar shape of the deformation body in combination with the installation in travel direction effects an optimal measurement system.

According to another feature of the invention, a rigid protective sleeve made of steel or aluminum is arranged on one side of the connection bar around the area of the connection between the respective bar-shaped force transducer and the respective connection bar. The side of the protective sleeve, that is not attached, can have a sealing of plastic to avoid contamination. This protective sleeve provides in addition to the mechanical protection also a partial protection against electromagnetic fields.

According to another feature of the invention, the diameter of the rigid protective sleeve is selected such that its inner surface acts as overload stop. This further improves the mechanical protection of the deformation body against overload.

According to another feature of the invention, a folding bellows of stainless steel is arranged around the area of the connection between the respective bar-shaped force transducer and the respective connection bar, and has on both ends a portion for hermetic sealing. This refinement of the device is preferred, when a good protection against corrosion and contamination is desired.

BRIEF DESCRIPTION OF THE DRAWING

Structure, function, and further advantages of the device for monitoring wear on overhead lines via a force measurement system are described hereinafter in greater detail with reference to exemplary embodiments in combination with schematic drawings.

DESCRIPTION OF THE DRAWINGS

Figure 1:
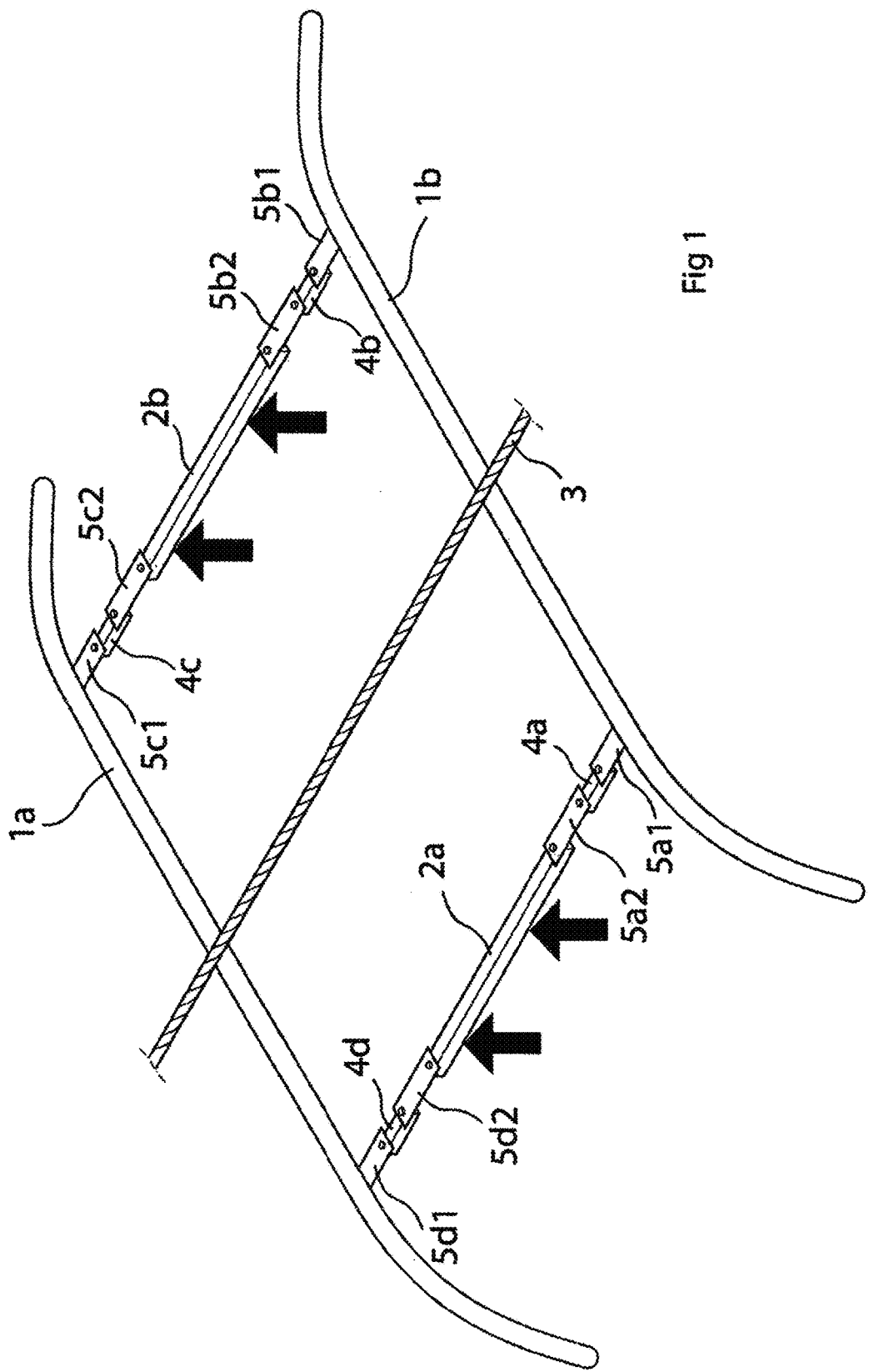

FIG. 1 shows a perspective schematic illustration of a first embodiment of a device for monitoring wear on overhead lines.

Figure 2:
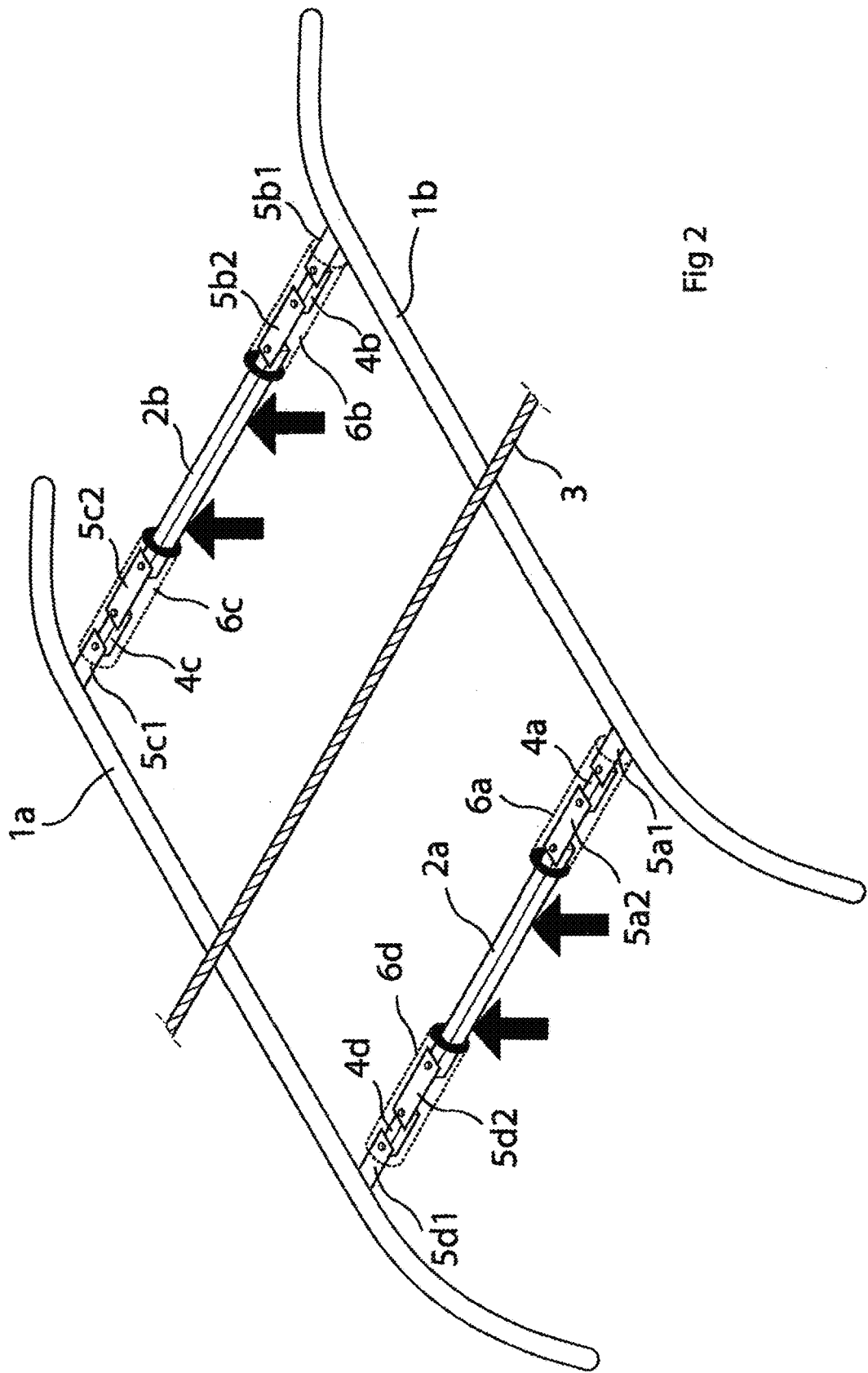

FIG. 2 shows a perspective schematic illustration of a second embodiment of the device for monitoring wear on overhead lines.

FIG. 3a shows, a portion of the embodiment according to FIG. 2, on an enlarged scale, with a protective sleeve.

Figure 3B:
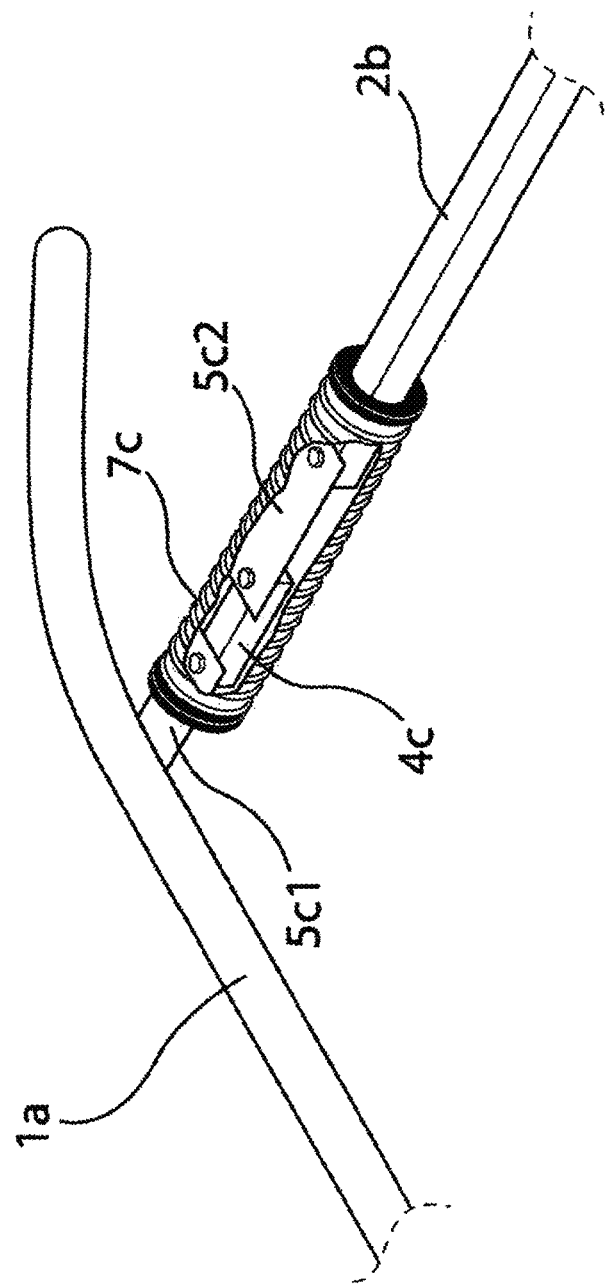

FIG. 3b shows a portion of the embodiment according to FIG. 2, on an enlarged scale, with a folding bellows.

FIG. 4 shows a prior art dual current collector.

DETAILED DESCRIPTION OF PREFERRED EMBODIMENTS

As shown in FIG. 4, the dual current collector according to the state of the art includes two contact bars (1a, 1b) and two connection bars (2a, 2b) connected therewith, with the contact bars (1a, 1b) being arranged in the operating mode at a right angle to the overhead line (3), and with the connection bars (2a, 2b) being arranged in parallel relation thereto. Press-on rods, coupled with the connection bars (2a, 2b) but not shown, urge the contact bars (1a, 1b) upon the overhead line (3). The arrow tips of the 4 upwardly directed force arrows point to the coupling points of the not shown press-on rods.

FIG. 1 shows a first embodiment of a device for monitoring wear on overhead lines, including a bar-shaped force transducer (4a-4d) arranged at each end portion of the two connection bars (2a, 2b) and extending in parallel relation to the overhead line (3), i.e. in travel direction. As a result, only the relatively small end faces of the bar-shaped force transducers (4a-4d), but not their significantly larger side surfaces, cause air resistance during travel. The bar-shaped force transducers (4a-4d) are connected with the two contact bars (1a, 1b) via plate-shaped spring elements (5a1-5d1) and with the two connection bars (2a, 2b) via plate-shaped spring elements (5a2-5d2). Also these plate-shaped spring elements (5a2-5d2) are aligned in such a way that only their relatively small end faces point in travel direction and thus create only slight flow resistance.

The plate-shaped spring elements (5a1-5d1) and (5a2-5d2) absorb especially lateral impact loads and thus prevent their direct transfer to the bar-shaped force transducers (4a-4d). Such impact loads, encountered, for example, when icing of the overhead lines occurs or in the presence of greater damage to the overhead lines, could excessively strain the bar-shaped force transducers (4a-4d) and thereby cause damage, in the absence of these spring elements.

With this force measurement system and after linkage via signal connection with an appropriate electronic evaluation system which processes electrical and optical measuring signals, the force applied by the contact bars (1a, 1b) upon the overhead line (3) can be measured, whereby the measurement can be carried out both at standstill of the vehicle and during travel.

As shown in FIG. 2 and FIG. 3a, a rigid protective sleeve (6a-6d) made of steel or aluminum is arranged on one side on the connection bar (2a, 2b) around the area of the connection between the respective bar-shaped force transducer (4a-4d), the respective plate-shaped spring element (5a1-5d1), and the respective connection bar (2a, 2b). Advantageously, the diameter of the rigid protective sleeve (6a-6d) is selected such that its inner surface acts as an overload stop in the presence of a load which would cause an inadmissibly great deflection and thus damage to the force transducer (4a-4d). To protect the inner surface of the rigid protective sleeve (6a-6d) from contamination, the non-attached side of the protective sleeve is provided with a not shown soft-elastic seal. The soft-elastic seal can be, for example, silicone rubber.

As shown in FIG. 3b, a folding bellows (7a-7d) made of stainless steel is arranged around the area of the connection between the respective bar-shaped force transducer (4a-4d), the respective plate-shaped spring element (5a1-5d1), and the respective connection bar (2a, 2b), and has on both ends a portion for hermetic sealing. This embodiment can, preferably, be used, when a particularly good encapsulation of the force transducer is demanded.

The drawings only show few preferred embodiments. All equivalent variations and modifications, which are realized in accordance with the appended claims, are covered by these claims.

What is claimed is:

1. A device for monitoring wear on an overhead line, comprising a force measurement system comprising:
    two contact bars oriented at a right angle to the overhead line;
    two connection bars oriented in parallel relation to the overhead line and pushed upwards to thereby press the two contact bars against the overhead line at a predefined force, each said connection bar having a first end portion and a second end portion;
    bar-shaped force transducers respectively arranged at the first and second end portions of the two connection bars for arrangement of strain sensors, each said force transducer having first and second end portions, wherein
        the first end portion of two first ones of the force transducers is connected to one of the contact bars,
        the first end portion of two second ones of the force transducers is connected to the other one of the contact bars,
        the second end portion of one of the first ones of the force transducers is connected to the first end portion of one of the connection bars,
        the second end portion of the other one of the first ones of the force transducers is connected to the first end portion of the other one of the connection bars,
        the second end portion of one of the second ones of the force transducers is connected to the second end portion of the other one of the connection bars,
        the second end portion of the other one of the second ones of the force transducers is connected to the second end portion of the one of the connection bars,
        the one of the first ones of the force transducers and the other one of the second ones of the force transducers defining a longitudinal axis which extends in a direction of a longitudinal axis defined by the one of the connection bars, and the other one of the first ones of the force transducers and the one of the second ones of the force transducers defining a longitudinal axis which extends in a direction of a longitudinal axis defined by the other one of the connection bars, and
    a folding bellows made of stainless steel and arranged around an area of connection between each of the force transducers and a respective one of the connection bars, said folding bellows having ends, each configured to form a hermetic seal.

2. The device of claim 1, further comprising a plate-shaped spring element arranged between each of the contact bars and the force transducers.

3. The device of claim 1, further comprising a plate-shaped spring element arranged between the first end portion of each of the connection bars and the first end portion of each of the first ones of the force transducers, and a plate-shaped spring element arranged between the second end portion of each of the connection bars and the second end portion of each of the second ones of the force transducers.

4. The device of claim 1, further comprising a plate-shaped first spring element arranged between each of the contact bars and the first end portion of the force transducers, and a plate-shaped second spring element arranged between each of the connection bars and the second end portions of the force transducers.

5. The device of claim 1, wherein the force transducers include FBG sensors.

6. The device of claim 1, further comprising a rigid protective sleeve made of steel or aluminum and secured to one side of each of the connection bars around an area of connection between the respective one of the force transducers and the connection bar.

7. The device of claim 6, wherein the protective sleeve has a diameter of a size sufficient for an inner surface of the protective sleeve to act as an overload stop.

* * * * *